(12) United States Patent
Choi et al.

(10) Patent No.: US 7,926,958 B2
(45) Date of Patent: Apr. 19, 2011

(54) MOBILE TERMINAL HAVING PROJECTOR AND METHOD FOR CONTROLLING THE SAME

(75) Inventors: Hyun-Bo Choi, Gyeonggi-Do (KR); Matthew Dehamer, San Diego, CA (US)

(73) Assignee: LG Electronics Inc., Seoul (KR)

( * ) Notice: Subject to any disclaimer, the term of this patent is extended or adjusted under 35 U.S.C. 154(b) by 346 days.

(21) Appl. No.: 12/177,764

(22) Filed: Jul. 22, 2008

(65) Prior Publication Data

US 2009/0033877 A1 Feb. 5, 2009

Related U.S. Application Data

(60) Provisional application No. 60/952,671, filed on Jul. 30, 2007.

(51) Int. Cl.
*G03B 21/26* (2006.01)

(52) U.S. Cl. .............................. 353/119; 353/36; 353/99

(58) Field of Classification Search .................... 353/36, 353/99, 119
See application file for complete search history.

(56) References Cited

U.S. PATENT DOCUMENTS

2006/0267858 A1* 11/2006 Yun et al. ..................... 345/1.1
* cited by examiner

*Primary Examiner* — Seung C Sohn
(74) *Attorney, Agent, or Firm* — Lee, Hong, Degerman, Kang & Waimey (57) ABSTRACT

A mobile terminal including: a main body having a wireless communication module; and a projector mounted at the main body and projecting beams to display an image on an image display region separated from the main body, wherein when an operation mode is being executed while the image is being displayed, the projector displays a notification message indicating the executed operation mode on the image display region. If the operation mode is executed while an image is being displayed by means of the projector, the corresponding information is displayed on the image display region, to thus effectively transfer the information about the execution of the operation mode to the user.

18 Claims, 8 Drawing Sheets

MOBILE TERMINAL HAVING PROJECTOR AND METHOD FOR CONTROLLING THE SAME

CROSS REFERENCE TO RELATED APPLICATIONS

The present application claims priority to U.S. Provisional Application No. 60/952,671 on Jul. 30, 2007, the entire contents of which is hereby incorporated by reference in its entirety.

BACKGROUND OF THE INVENTION

1. Field of the Invention

The present invention relates to a mobile terminal having a projector and a method for controlling the same.

2. Description of the Related Art

A mobile terminal is a device which may be configured to perform various functions. Examples of such functions include data and voice communications, capturing images and video via a camera, recording audio, playing music files via a speaker system, and displaying images and video on a display. Some terminals include additional functionality which supports game playing, while other terminals are configured as multimedia players.

Efforts are ongoing to support and increase the functionality of mobile terminals. Such efforts include software and hardware improvements. For example, a user interface environment is provided to allow users to easily and conveniently search or select functions.

As the mobile terminal is implemented as multimedia players, electronic components for implementing various other functions than the wireless communication function of the mobile terminal, such as a camera module, a broadcast receiving module, or the like, are being mounted in the mobile terminal.

SUMMARY OF THE INVENTION

Accordingly, one object of the present invention is to address the above-noted and other problems.

Another object of the present invention is to effectively inform a user that an operation mode has been executed, while an image is being displayed, by displaying the fact on an image display region of a projector.

To achieve these and other advantages and in accordance with the purpose of the present invention, as embodied and broadly described herein, the present invention provides in one aspect a mobile terminal including: a main body having a wireless communication module; and a projector mounted at the main body and projecting (emitting) beams to display an image on an image display region separated from the main body, wherein when an operation mode is being executed while the image is being displayed, the projector projects beams to display a notification message indicating the executed operation mode on the image display region.

The main body may be formed to be supported by a support face, and the image display region may be formed on a screen positioned separately from the main body.

The main body may include first and second bodies which are foldably connected by a hinge unit, and the projector may be rotatably mounted at the hinge unit.

The projector may be configured to be rotatable to project beams in a first direction limited by mutually contacting faces of the first and second bodies in a folded configuration and a second direction which is the opposite to the first direction.

At least one of the first and second bodies may include an internal screen to which beams are projected in the first direction, and the internal screen may be extended from one of the first and second bodies and may have one end which is combined to the other of the first and second bodies.

The hinge unit may include a stopper that stops a relative movement of the first and second bodies at a certain angle so that the first and second bodies may be supported on the ground at the certain angle.

The operation mode may include a call reception mode or a message reception mode, and the notification message may include at least one of the name, a phone number, a photo and an image or a caller and message content.

The main body may include a manipulation unit to control an output of the image.

The projector may display a virtual image that can be inputted by a touch or a motion to the image display region, and the main body may further include a sensing unit to sense the touch or the motion.

The mobile terminal may further include: a focus control unit to automatically control a focus of an image formed by the projector.

To achieve these and other advantages and in accordance with the purpose of the present invention, as embodied and broadly described herein, the present invention provides in another aspect a method for controlling a mobile terminal, including: projecting beams by using a projector to output an image to an image display region separated from a main body; and executing an operation mode while the image is being displayed, and outputting a notification image indicating that the operation mode has been executed on the image display region by using the projector.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE INVENTION

Reference will now be made in detail to the preferred embodiments of the present invention, examples of which are illustrated in the accompanying drawings.

A mobile terminal according to the embodiments of the present invention will now be described in detail.

Figure 1:
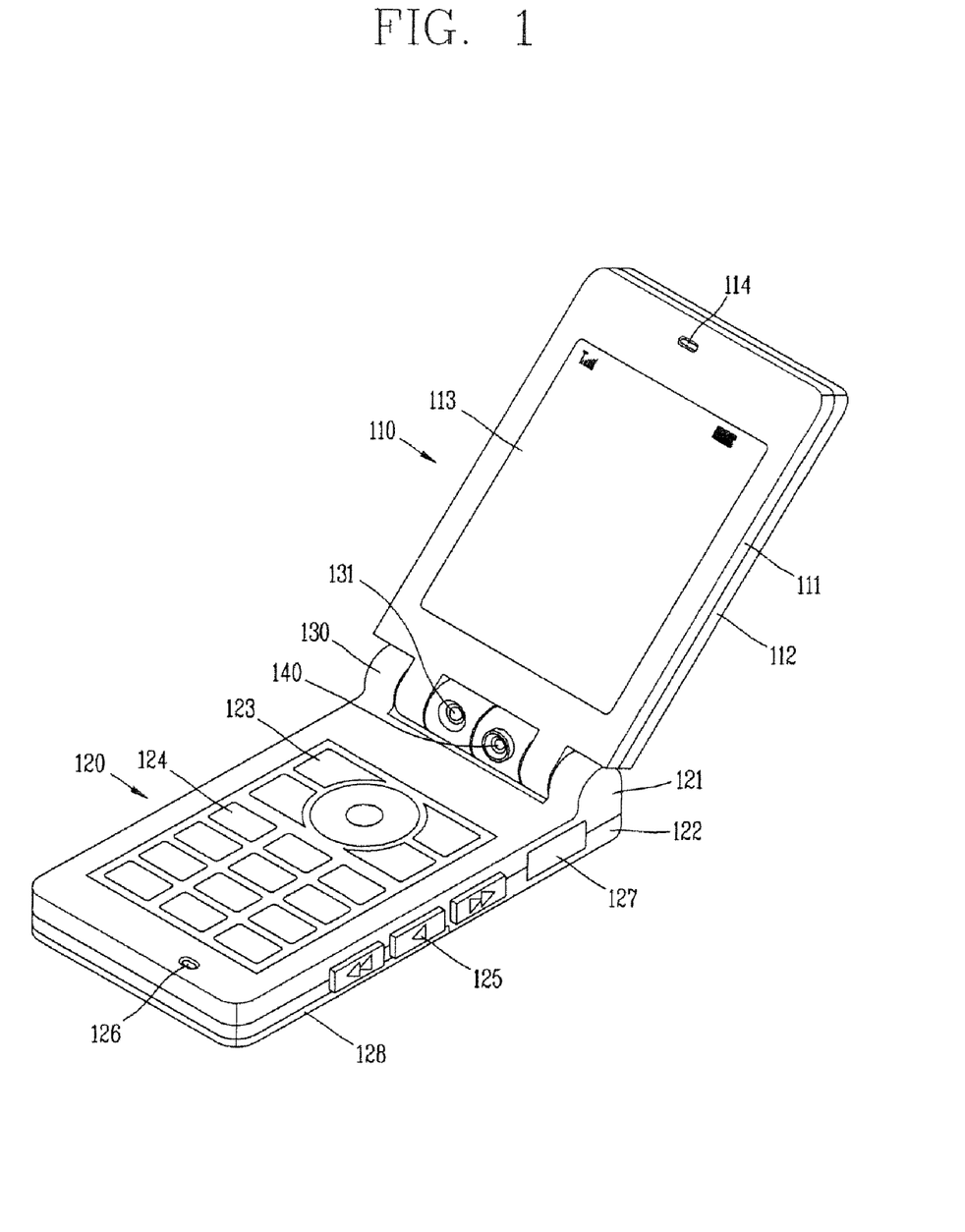
FIG. 1 is a front perspective view of a mobile terminal according to one embodiment of the present invention.

FIG. 1 is a front perspective view of a mobile terminal according to one embodiment of the present invention.

The mobile terminal 100 according to an embodiment of the present invention includes a first body 110, and a second body 120 configure such that one side thereof is folded or unfolded with respect to the first body 110.

The state in which the first and second bodies 110 and 120 are disposed to overlap may be called a folded configuration, and as shown in FIG. 1, the state in which the first body 110 is rotated at a certain angle with respect to the first body 120 may be called an unfolded configuration.

The mobile terminal 100 may usually operate in a standby mode in the folded configuration, but this mode can be released by user manipulation. In the unfolded configuration, the mobile terminal may mainly function in a call mode or the like, but may be changed to the standby mode according to user manipulation or after the lapse of a certain time.

A case (housing, casing, cover, etc.) constituting the external appearance of the first terminal body 110 comprises a front case 111 and a rear case 112, and various electronic components may be installed in a space formed by the front case 111 and the rear case 112.

The cases can be formed by injection-molding a synthetic resin, or made of a metallic material such as stainless steel (STS), titanium (Ti), or the like.

On the first body 110, specifically, on the front case 111, there may be disposed a first display unit 113 and a first audio output unit 114.

The first display unit 113 is configured to visually display information, and may be configured as a touch screen form allowing a user to input information in a tactile manner.

The first audio output unit 114 may be implemented in the form of a receiver or a speaker, and in the following description, the audio output unit 114 will be referred to as a receiver 114.

Like the first body 110, the second body 120 may be formed by a front case 121 and a rear case 122.

First and second manipulation units 123 and 124 may be disposed on the second body 120, specifically, on a front surface of the front case 121. The first and second manipulation units 123 and 124 receive an instruction for controlling the operation of the mobile terminal 100.

A third manipulating unit 125, an audio input unit 126, and an interface 127 may be disposed on at least one of the front case 121 and the rear case 122.

The first to third manipulation units may be generally called a manipulation portion, and may employ any method so long as it allows a user to perform manipulation with a tactile feeling.

For example, the manipulation portion may be implemented as a dome switch or a touch pad that receive a command or information according to a push or touch manipulation by the user, or may be implemented in a manner to be manipulated such as a wheel for rotating a key, a jog type, a joystick, or the like.

In terms of function, the first manipulation unit 123 is to input a command such as start, end, scroll, etc., and the second manipulating unit 124 is to input numbers, characters, symbols, etc. The third manipulating unit 125 may operate as a hot key for performing a particular function such as activation of the image input unit (115 in FIG. 3) or adjusting of sound volume of the audio output unit 114.

The audio input unit 126 may be implemented in the form of, for example, a microphone to receive voice of the user or other sounds.

The interface 127 serves as a path for allowing the mobile terminal to exchange data with an external device. For example, the interface 127 may be implemented as one of a connection port (terminal) for connecting an ear phone to the mobile terminal via a fixed or wireless means, a port (e.g., an IrDA port), a Bluetooth™ port, a wireless LAN port, or a power supply port that supplies power to the mobile terminal, or the like.

The interface 127 may be a card socket for accommodating an external card, such as a Subscriber Identity Module (SIM), a User Identity Module (UIM), a memory card for storing information, or the like.

A power supply unit 128 for supplying power to the mobile terminal is mounted on the rear case 122. The power supply unit 128 may be detachably combined to charge power as, for example, a rechargeable battery.

An image input unit 131 and a projector 140 are rotatably mounted on the hinge unit 130.

The image input unit 115 may be implemented in the form of a camera module to capture an image or video with respect to a user and so on. The image input unit 115 may be mounted to be rotatable on the hinge unit 130 to capture a subject location in a plurality of directions, or may be mounted on the first body 110 or the second body 120.

The projector 140 is configured to project beams to an image display region separated from the terminal body, namely, the first and second bodies 110 and 120 to display an image on the image display region, and may be implemented in the form of an LCD projector, a laser projector, or the like. The projector 140 may be also rotatably mounted on the hinge unit 130 to display an image on image display regions positioned in a plurality of directions.

Figure 2:
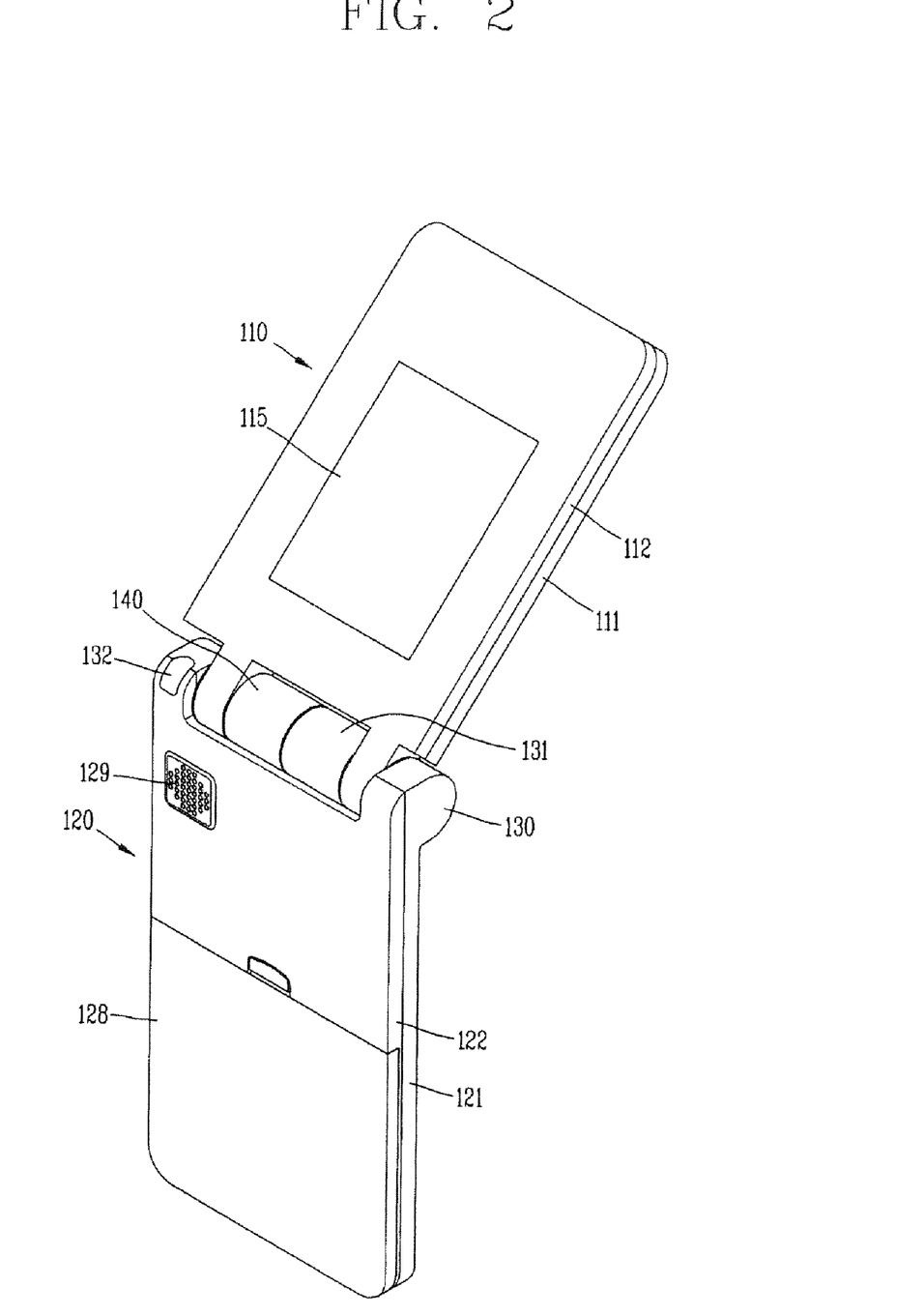
FIG. 2 is a rear perspective view of a mobile terminal according to one embodiment of the present invention.

FIG. 2 is a rear perspective view of a mobile terminal according to one embodiment of the present invention.

A second display unit 115 may be mounted on the rear case 112 of the first body 110.

Like the first display unit 113, the second display unit 115 visually displays information and may serve as an auxiliary display of the first display unit 113. For example, if a call is received in a call standby mode, the second display unit 115 may display a phone number of another party or display content of a received message.

A second audio output unit 129 may be additionally disposed on the rear case 122 of the second body 120. The second audio output unit 129 may implement a stereophonic function together with the first audio output unit (114 in FIG. 1), and may be used for a call in a speaker phone mode.

A broadcast signal reception antenna 132 may be disposed at one side of the second body 120 in addition to an antenna for call communication. The antenna 132 may be installed on the second body 120 such that it can be extended.

Figure 3:
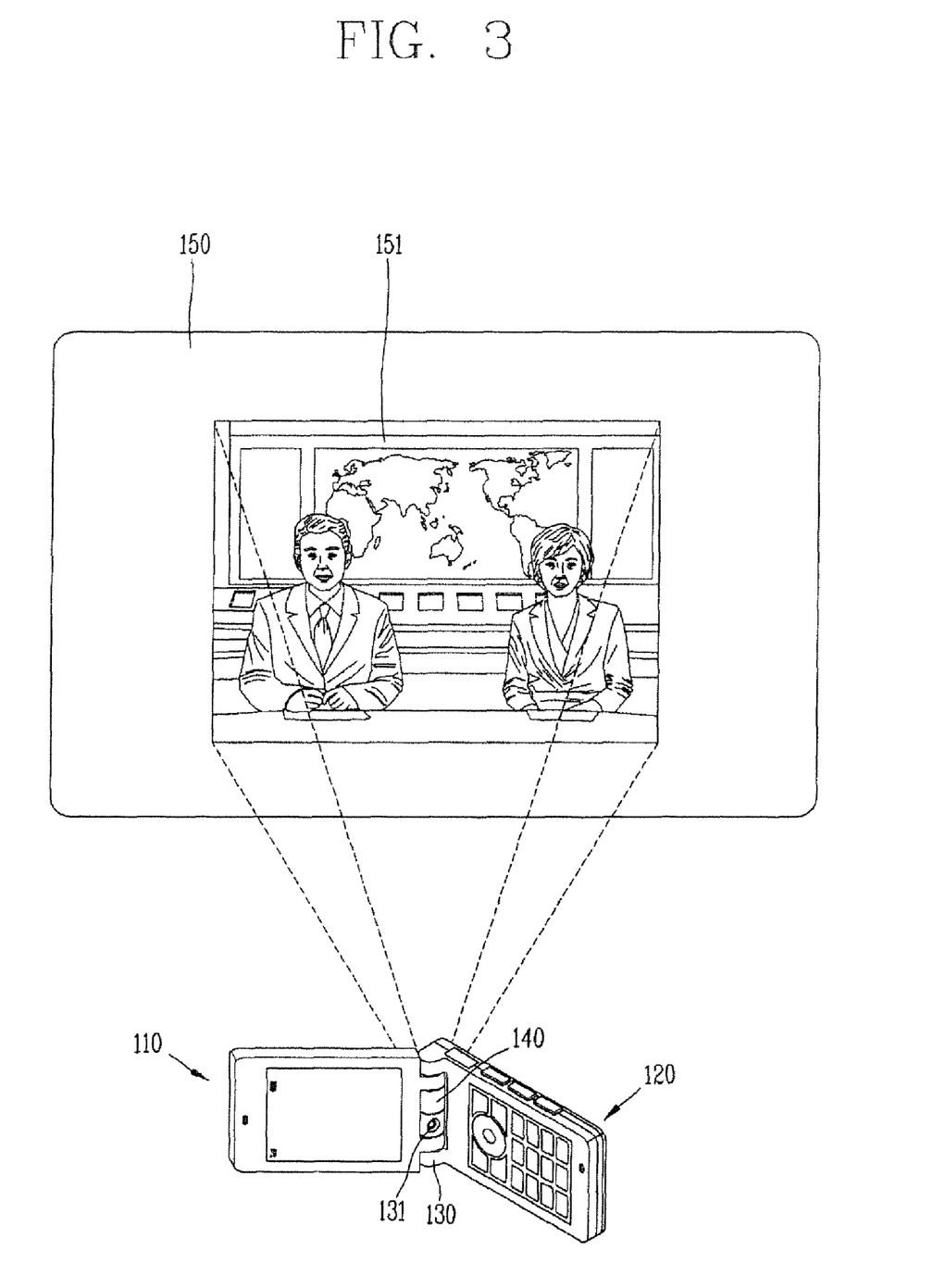
FIG. 3 is a perspective view of the mobile terminal showing one example of an operation state of the mobile terminal according to an embodiment of the present invention.
Figure 4:
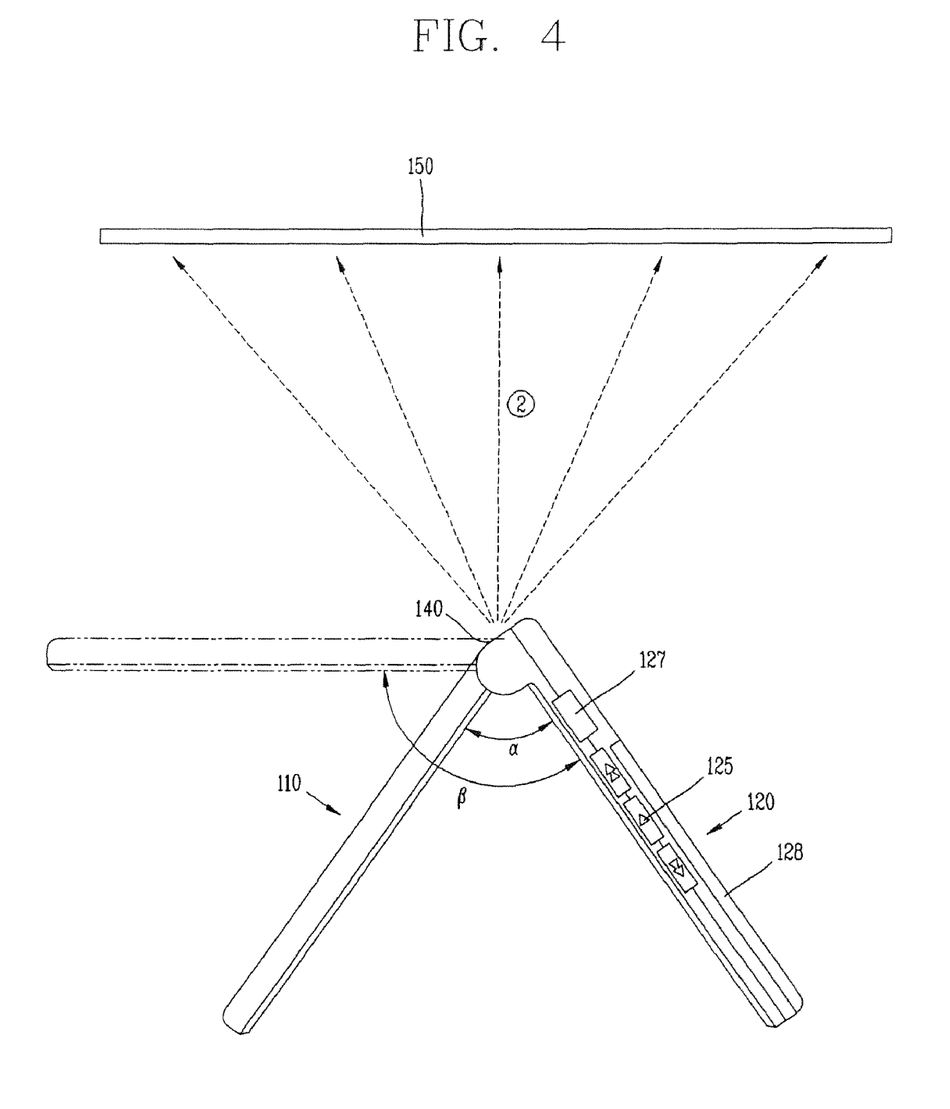
FIG. 4 is a plan view of the mobile terminal in FIG. 3.

FIG. 3 is a perspective view of the mobile terminal showing one example of an operation state of the mobile terminal according to an embodiment of the present invention, and FIG. 4 is a plan view of the mobile terminal in FIG. 3.

With reference to FIGS. 3 and 4, the first and second bodies 110 and 120 may be mounted such that they can be supported by a support face, and the projector projects beams onto a screen 150 or a wall spaced apart from the first and second bodies 110 and 120. Accordingly, an image 151 is displayed on an image display region of the screen 150 by virtue of the beams projected by the projector 140. Arrows in FIG. 4 indicate a path of the beams projected from the projector 140.

Figure 5:
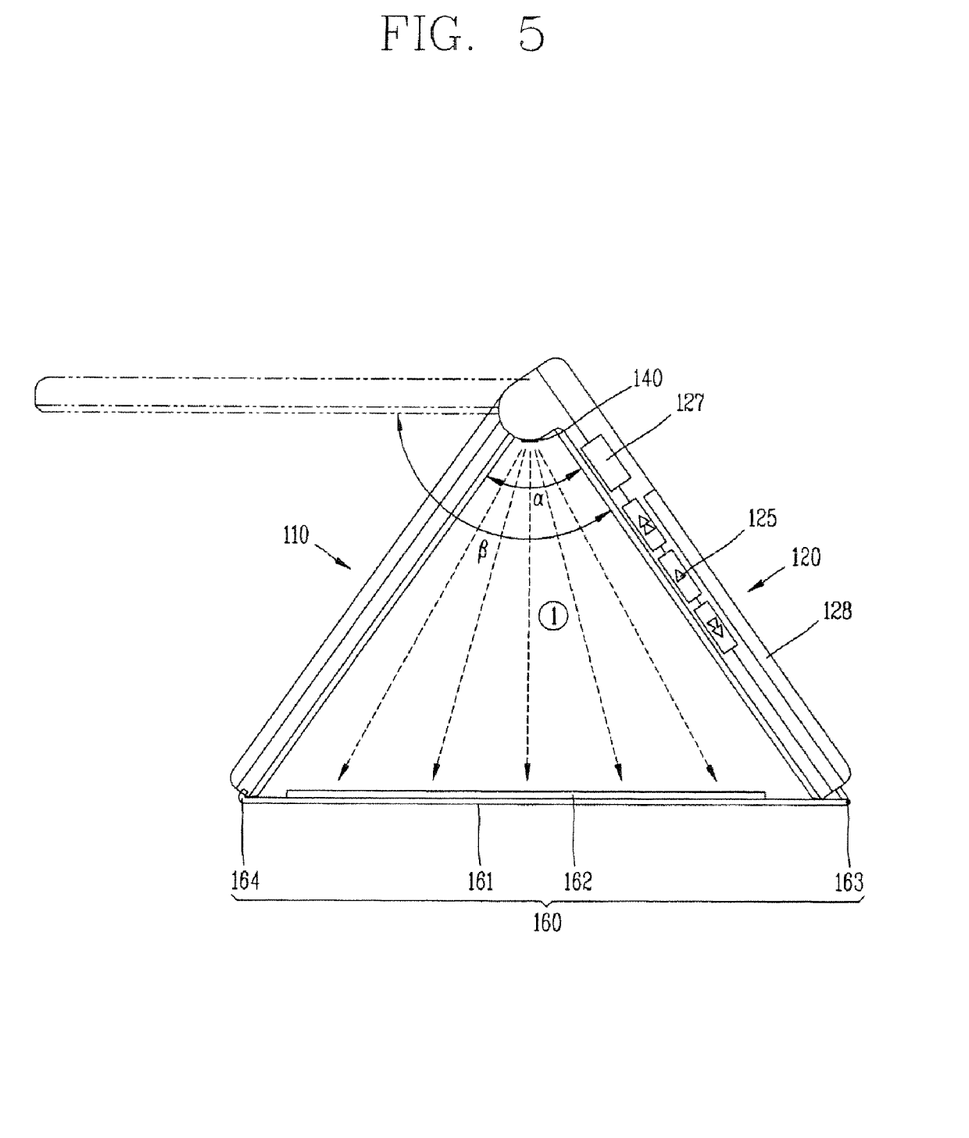
FIG. 5 is a plan view of the mobile terminal showing another example of an operation state of the mobile terminal according to an embodiment of the present invention.

The projector 140 may be implemented to be rotatably moved to project beams in a first direction (①) in FIG. 5) defined by facing surfaces of the first and second bodies 110 and 120 (which come in contact when folded) in an unfolded configuration at a certain angle, and project beams in a direction (②) which is the opposite to the first direction (①).

As shown in FIGS. 3 and 4, the projector 140 project beams in the second direction (②), namely in the opposite direction of surface on which the first display unit 113 and the first and second manipulation units 123 and 124 are positioned, to display an image on the screen 150 positioned in the second direction (②).

When the projector 140 is directed in the second direction (②), the distance between the screen 150 and the mobile terminal can be adjusted to implement a large screen and several people may view an image displayed on the screen. Accordingly, a presentation may be performed by using the mobile terminal, or some may enjoy movies.

Here, the third manipulation unit 125 may be implemented in the form of a control key to control an output of the image 151. The user may manipulate the control key to a next image or a previous image of the image 151 currently displayed on the screen 150, stop an image being reproduced or magnify or reduce the image in size.

Controlling of the image output may be performed by the first and second manipulation units 123 and 124 as well as by the third manipulation unit 125, and if the display units 113 and 115 are implemented in the form of a touch screen, controlling of the image output may be implemented by touching the touch screens.

The first and second bodies 110 and 120 may be positioned on a support surface at a certain angle such that they can be stably supported thereon. Here, the hinge unit may include a stopper to stop a relative rotation of the first and second bodies 110 and 120 at a first angle (α) after the first and second bodies 110 and 120 are rotated in a folded configuration.

The stopper may be configured to stop a relative rotation of the first and second bodies 110 and 120 at a second angle (β) corresponding to the angle of the user's face when the first and second bodies 110 and 120 are rotated to the unfolded configuration.

Because the stopper is configured to stop the relative movement of the first and second bodies 110 and 120 at the first and second angles (α and β), the mobile terminal may operate in a projection mode at the first angle (α) and may operate in a phone call mode at the second angle (β).

In addition to the above-described configuration, the hinge unit 130 may be configured in the form of a free-stop hinge allowing the first and second bodies 110 and 120 to stop their relative rotation at an arbitrary angle.

FIG. 5 is a plan view of the mobile terminal showing another example of an operation state of the mobile terminal according to an embodiment of the present invention.

The mobile terminal may include an internal screen 160 to which beams projected from the projector 140 may be irradiated when the projector 140 is directed in the first direction (①).

The internal screen 160 may be installed in the second body 120 such that it is extended, and may be connected to one end of the first body 110 when extended.

The internal screen 160 may include a screen body 161 formed to have a plate shape and a screen member 162 mounted on the screen body 161.

The screen body 161 may include a hinge connection portion 163 whereby it can perform rotational operation toward the first body 110 when extended, and a connection portion 164 may be provided at one end of the screen body 161 and connected to the first body 110. the connection portion 164 may have any form so long as it can be detachable, and for example, the connection portion 164 may have the form of an insertion protrusion inserted into an insertion recess formed at the first body 110.

The screen member 162 may be made of a synthetic resin material to allowing beams projected from the projector 140 to form a sharp image thereon, and may be detachably attached to the screen body 161.

Meanwhile, instead of the connection portion 163, the internal screen 140 may be made of an elastic material so as to be deformed in the direction of the first body when extended so as to be connected to the first body.

When an image is displayed on the internal screen 160 as the projector 140 projects beams in the first direction (①), the mobile terminal may be used to allow the user to watch video, images, or the like. In addition, the mobile terminal may be used as a view finder of the image input unit 131, and when the image input unit 131 and the user's eyes are in the mutually opposite direction, the user may watch an image captured by the image input unit 131 through the internal screen 140.

In the above description, the internal screen 140 is mounted to be extended from the first body 110, but without being limited thereto, the internal screen 140 may be extended from the second body 120 and connected to the first body 110.

The mobile terminal may further include a focus control unit to automatically control the focus of an image formed by beams projected from the projector 140.

The focus control unit may be implemented in the form of a distance sensor or a motion sensor. When the distance sensor is used as the focus control unit, the distance sensor may be implemented by using ultrasonic waves, laser, an infrared sensor, or the like, and the distance sensor measures the distance from the screen 150 or the internal screen 160 in order to control a focus of the formed image.

The focus control unit may be mounted on the projector 140 or on the first body 110 or second body 120, and the focus of the image captured by the image input unit 131 may be adjusted.

Figure 6A:
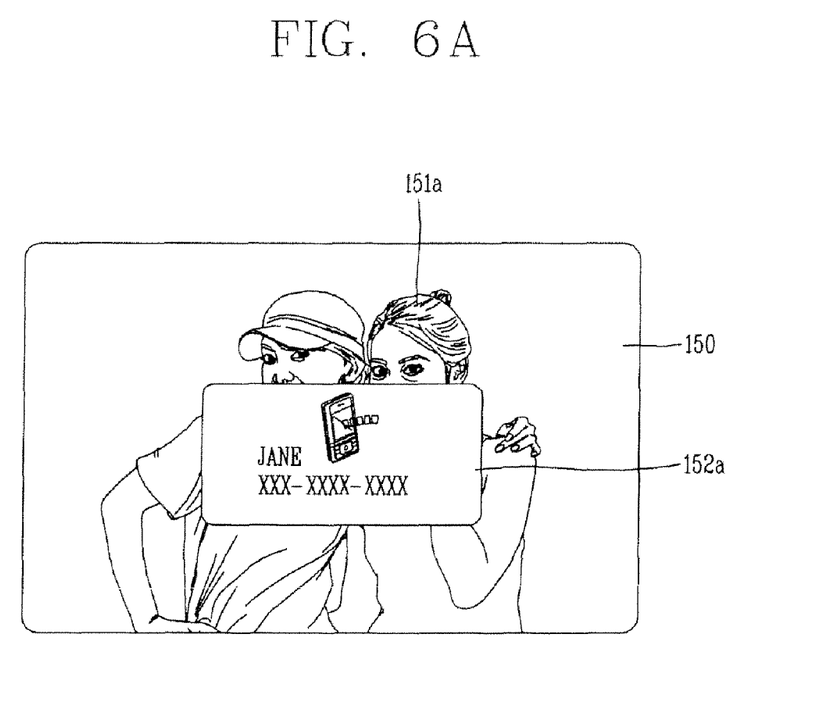
FIGS. 6A and 6B are front views of screen images showing operation states of a projector according to one embodiment of the present invention.
Figure 6B:
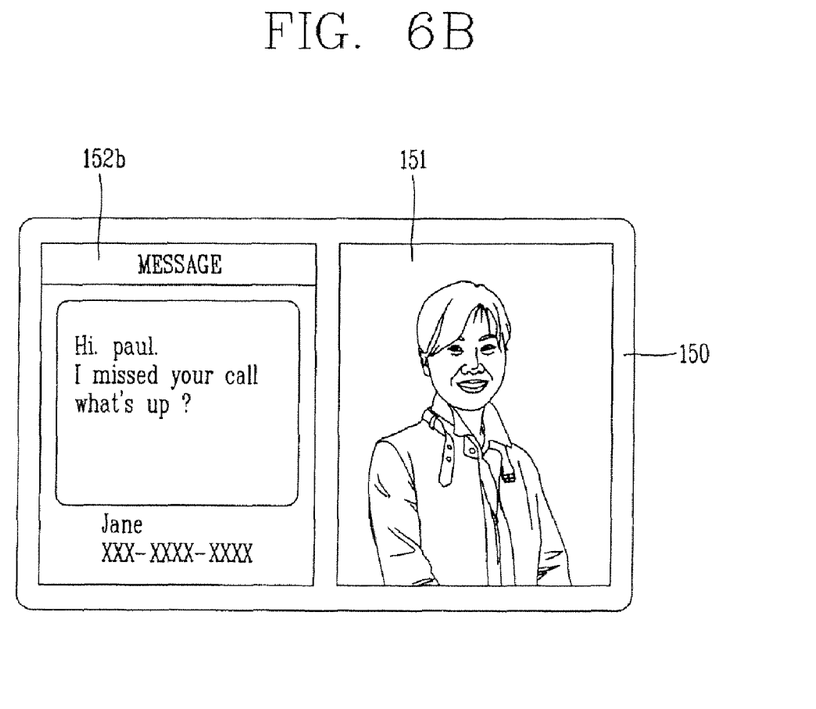

FIGS. 6A and 6B are front views of screen images showing operation states of the projector according to one embodiment of the present invention.

When an operation mode is executed while images 151a and 151b is being displayed, the projector 140 displays notification images 152a and 152b informing that the operation mode is executed on image display regions. Namely, if an operation mode different from the image display mode is executed while the image display mode is operating, the projector 140 may display the notification images 152a and 152b on the screen 150 to allow to visually recognize that.

Examples of the operation mode may include operation modes related to wireless communication such as a call reception mode, a message reception mode, or the like, (i.e., operation modes largely related to reception of radio signals), or an operation mode for providing system information of the mobile terminal such as an alarm mode to inform the user about a set time.

FIG. 6A shows a case that when a call is received by the mobile terminal while the image 151a is being displayed, the projector 140 displays the notification image 152a visually informing about the call reception situation on the screen 150.

The notification message 152a may have various forms such as the name of a caller, a phone number, a photo, an image, or the like. In addition, the notification image 152a may be displayed in an overlaid manner on the image 151a. Here, when the notification image 152a is displayed in the overlaid manner on the image 151a of the screen 150, the currently displayed image 151a may be displayed to be dim compared with the notification image 151a.

If the image display mode executes video, the mobile terminal may be controlled to stop execution of the video.

FIG. 6 shows a case that when a text message is received by the mobile terminal while the image 151a is being displayed, the projector 140 displays the notification image 152b visually informing about the reception of the text message.

The notification image 152b may have at least one of forms of an origination number of a message, a sender, and message content. The notification image 152b may be displayed at one portion of the image display region while the currently displayed image 151b may be displayed with a reduced size at another portion of the image display region. Accordingly, the image display region may be divided into one portion at which the notification image 152b is displayed and another portion at which the image 151b is displayed.

Alternatively, the notification images 152a and 152b may be displayed to replace the currently displayed images 151a and 151b. In this case, the notification images 152a and 152b are displayed on the entire image display region while displaying of the currently displayed images 151a and 151b is stopped.

Although not shown, if the operation mode is the alarm mode for informing about a set time, the notification image may be implemented in the form of an image indicating the set time or time information related to time.

Figure 7A:
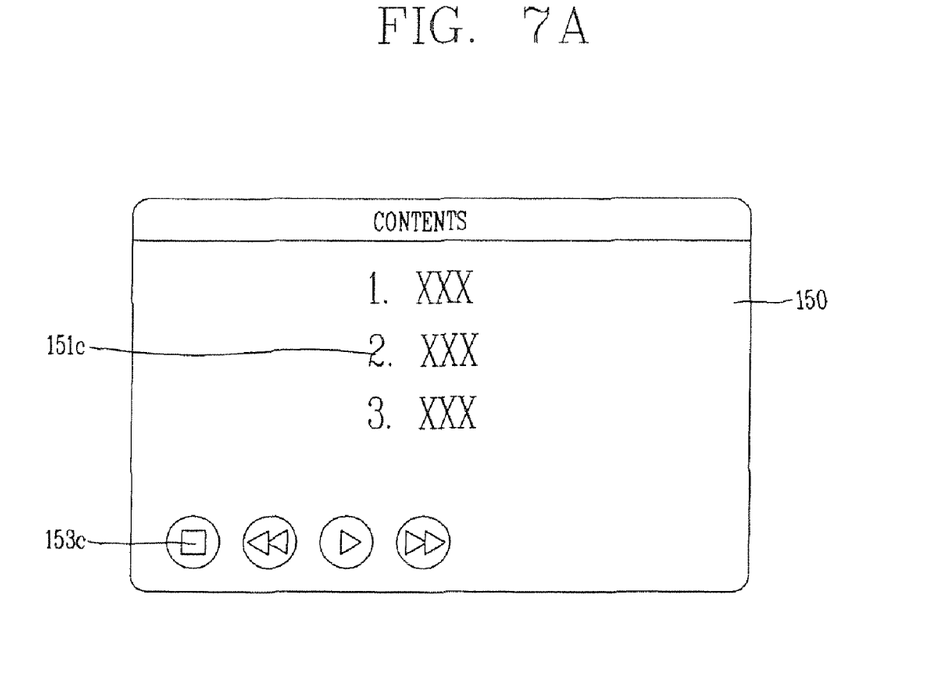
FIGS. 7A and 7B are front views of screen images showing operation states of the projector according to another embodiment of the present invention.
Figure 7B:
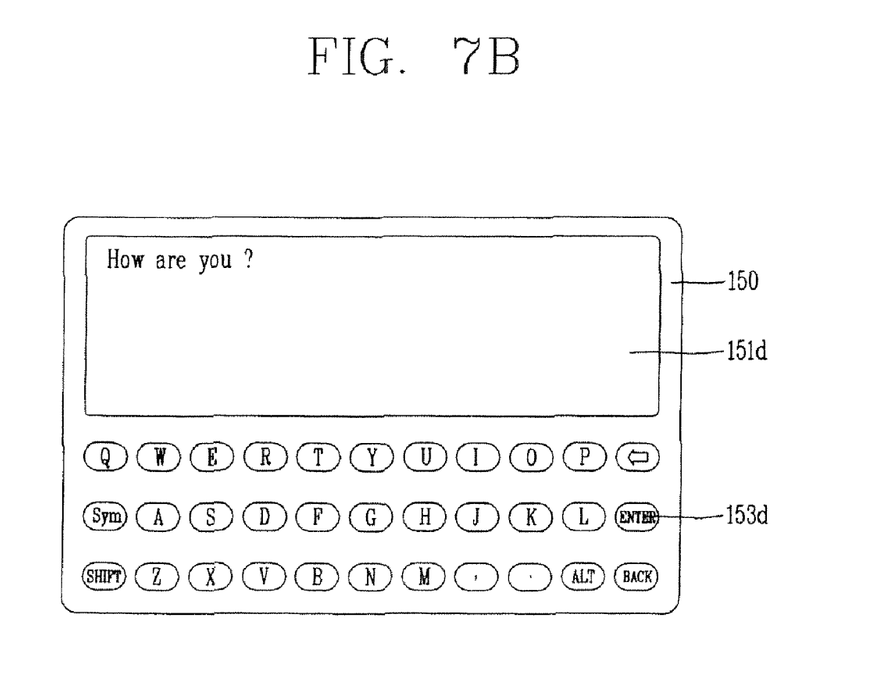

FIGS. 7A and 7B are front views of screen images showing operation states of the projector according to another embodiment of the present invention.

The projector 140 may be configured to display virtual images 153c and 153d that can be inputted by a touch or a motion on the image display region, and the mobile terminal may include a sensing unit (176 in FIG. 8) to sense the touch or the motion applied to the virtual images 153c and 153d.

For example, the sensing unit 176 may include the image input unit 131 having an infrared sensor and a signal processing unit. The infrared sensor tracks a motion of user's finger located on the virtual images 153c and 153d to sense an input, and the image input unit 131 may capture the angle and motion of the user's hand located on the virtual images 153c and 153d and input them as coordinate signals. The signal processing unit filters the coordinate signals to convert them into digital signals, and the controller 170 (See FIG. 8) of the mobile terminal controls outputting of the images 151c and 151d based on the inputted digital signals.

As shown in FIG. 7A, the virtual images may include a control icon 153c to control an image output, and the control icon 153c may have the form of icon to execute displaying of a next or previous image of a currently displayed image, increasing or decreasing the size of an outputted image, reproducing or stopping of video, or the like.

For example, when a presentation is made by using the projector 140 of the mobile terminal, the presenter may touch the control icon 153c on the screen 150 to display a next image of the currently displayed image on the screen 150.

With reference to FIG. 7B, the virtual image may include a keypad icon 153d for inputting at least one of a character, a number and a symbol. The user may touch the keypad icon 153d displayed on the screen 150 or apply a motion onto the keypad icon 153d to input a character, a number or the like in the mobile terminal or output them via an output window 151d displayed on the screen 150.

In the above description, the projector is mounted at the hinge part of the folder type mobile terminal, but without being limited thereto, the projector may be mounted at various positions of the mobile terminal and may be applicable to various types of mobile terminals such as a bar type mobile terminal, a slide type mobile terminal, a swing type mobile terminal, a swivel type mobile terminal, or the like.

Figure 8:
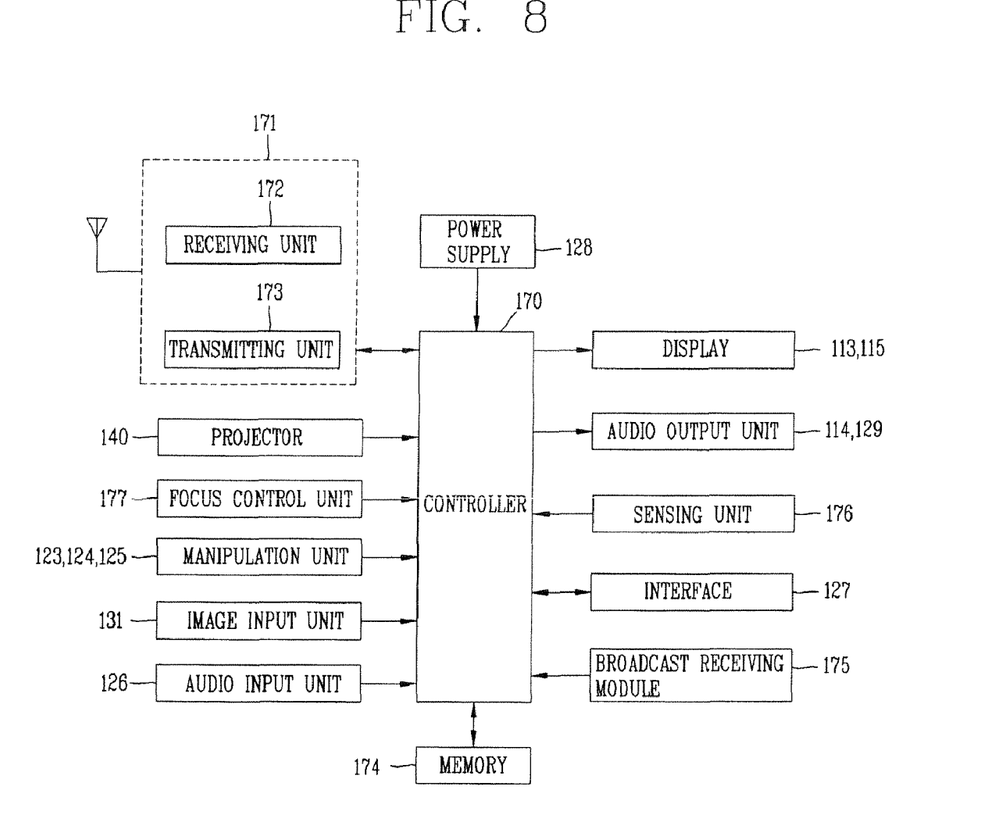
FIG. 8 is a schematic block diagram of the mobile terminal according to an embodiment of the present invention.

FIG. 8 is a schematic block diagram of the mobile terminal according to an embodiment of the present invention.

With reference to FIG. 8, the mobile terminal according to an embodiment of the present invention includes a wireless communication module 171, the manipulation units 123, 124, 125, the image input unit 131, the audio input unit 125, the display units 113 and 115, the audio output units 114 and 119, the sensing unit 176, the interface 127, the broadcast receiving module 175, the memory 174, the power supply unit 128, and the controller 170.

The controller 170 controls the general operation of the mobile terminal. For example, the controller 170 performs controlling and processing related to a voice call, data communication, a video call, or the like.

In addition to the controlling of the general function, the controller 170 also controls the operation of the mobile terminal related to the present invention. Namely, the controller 170 transmits a signal for outputting an image to the projector 140. The controller executes one operation mode among the image display mode of the projector and transmits a signal for displaying a notification image to inform about an execution of the operation mode.

For example, if the operation mode is a call reception mode and a radio signal is received from a receiving unit 172 of the wireless communication module 171, the controller 170 transmits a signal for executing the call reception mode to the respective elements, for example, to the display units 113 and 115 and the sound output units 114 and 129 Here, if the mobile terminal is in a vibration mode, the controller 170 may control the mobile terminal such that the vibration mode does not operate to prevent image formed by the beams projected from the projector from being affected by vibration.

In addition, the controller 170 transmits a signal for displaying the notification image (152a in FIG. 6A) to the projector 140 in order to inform about execution of a phone mode.

The wireless communication module 171 transmits/receives a radio signal t/from a mobile communication base station via an antenna. For example, the wireless communication module 171 includes a transmission unit 173 that handles transmission/reception of voice data, character data, image data and control data under the control of the controller 170 and includes the transmitting unit 173 for modulating a signal to be transmitted and transmitting the modulated signal and the receiving unit 172 for demodulating a received signal.

The manipulation units 123, 124 and 125 are configured as shown in FIG. 1, and provides key input data inputted to control the operation of the terminal by the user to the controller 170. The manipulation units 123, 124 and 125 may be implemented as control keys for controlling an executed stage of an image formed by beams projected from the projector 140.

The image input unit 131 may process image frames such as still images or video acquired by an image sensor in a video call mode or an image capture mode. The processed image frames may be converted into image data that can be displayed on the display unit 113 and then outputted to the display unit 113.

The image frames processed by the image input unit 131 may be stored in the memory 144 or transmitted externally via the wireless communication module 171 under the control of the controller 170.

The audio input unit 126 may receive external audio signals via a microphone in a phone call mode, a recording mode, a voice recognition mode, or the like, and process the received audio signals into electrical voice data. In the phone call mode, the processed voice data is converted into a form that can be transmitted to a mobile communication base station via the wireless communication module 171, and then transmitted to the wireless communication module 171. In the recording mode, the processed voice data is outputted to be stored in the memory 174.

The audio input unit 126 may include various types of noise canceling (or suppression) algorithms to cancel (or suppress) noise generated in the course of receiving and transmitting audio signals.

The display unit 113 may output information processed in the mobile terminal. For example, when the mobile terminal 100 is in the phone call mode, the display unit 113 may display a User Interface (UI) or a Graphic User Interface (GUI) associated with a call or other communication under the control of the controller 170. When the mobile terminal 100 is in the video call mode or the image capture mode, the display unit 113 may display a captured image, a UI, a GUI, and the like, under the control of the controller 170. If the display unit 113 is configured to have a touch screen, it may be also used as an input device besides the output device.

The audio output units 114 and 129 may convert audio data received from the wireless communication module 171 or stored in the memory 174 and output the converted data in a call signal reception mode, a phone call mode, a recording mode, a voice recognition mode, a broadcast reception mode, and the like, under the control of the controller 170.

Also, the audio output units 114 and 129 may provide audible outputs related to a particular function (e.g., a call signal reception sound, a message reception sound, etc.) performed by the mobile terminal.

The sensing unit 176 detects a current status (or state) of the mobile terminal such as an open/close state of the mobile terminal, a location of the mobile terminal, presence or absence of user contact with the mobile terminal, etc., and generates a sense (control) signal for controlling the operation of the mobile terminal. In addition, the sensing unit 176 can perform a sensing function as to whether or not the power supply unit 128 supplies power or whether or not the external interface 127 is coupled with an external device.

Additionally, when a touch is inputted to the touch screen part 113 or the touch key pad part 114 according to the present invention, the sensing unit 176 senses the touch and applies a touch signal to the controller 170. When a touch is In addition, as described above, the sensing unit may sense a touch or a motion applied to the virtual images (153c and 153d in FIGS. 7A and 7B) and transfer corresponding information to the controller 170.

As mentioned above, the focus control unit 177 adjusts the focus of an image formed by the beams projected from the projector 140 or an image captured by the image input unit 131.

The interface 127 may serve as an interface with at least one external device connected with the mobile terminal. For example, the external devices may include wired/wireless headsets, external power chargers, wired/wireless data ports, card sockets (e.g., for receiving a memory card, a Subscriber Identity Module/User Identity Module (SIM/UIM) card, etc.), and the like. The interface 127 may be used to receive inputs (e.g., data, information, power, etc.) from an external device and transfer the received inputs to one or more elements within the mobile terminal, or may be used to transfer data from the mobile terminal to another external device.

The memory 174 may store programs or the like used for the processing and controlling performed by the controller 170, or may temporarily store inputted/outputted data (e.g., a phonebook, messages, still images, video, etc.).

Also, the memory 174 stores a program that controls the operations of the mobile terminal 100 according to the present invention.

The memory 174 may include at least one type of storage medium including a hard disk type, a card-type memory (e.g., SD or XD memory, etc), a flash memory, a Random Access Memory (RAM), a Read-Only Memory (ROM), and the like.

The broadcast receiving module 175 may receive a broadcast signal transmitted through a satellite or terrestrial means, convert the same into a broadcast data format that can be outputted to the audio output units 114 and 129, the display unit 113 and the projector 140, and output the converted data to the controller 170. In addition, the broadcast receiving module 175 may receive supplementary data (e.g., Electronic Program Guide (EPG), a channel list, etc.) associated to a broadcast. The broadcast data and supplementary data converted by the broadcast receiving module 175 may be stored in the memory 174.

The power supply unit 128 is provided with internal or external power and supply power required for operations of the elements under the control of the controller 170.

As so far described, in the present invention, if the operation mode is executed while an image is being formed by the projector (i.e., while an image is being displayed by beams projected from the projector), the corresponding information is displayed on the image display region, to thus effectively transfer the information about the execution of the operation mode to the user.

In addition, because the projector is rotatably mounted at the hinge part of the first and second bodies, images can be displayed on image display regions positioned in a plurality of directions.

Also, because the internal screen can be extended, the projector can be used without being restricted in the position of the projection of beams.

Moreover, because the projector projects allows displaying of an inputtable virtual image, a more convenient user interface environment can be implemented.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A mobile terminal comprising:
a main body comprising a wireless communication module; and
a projector mounted at the main body configured to project beams to display an image on an image display region separated from the main body,
wherein the projector projects beams to display a notification message, while outputting the image, indicating an execution of an operation mode on the image display region when the operation mode is executed while the image is displayed.

2. The mobile terminal of claim 1, the main body is formed to be supported by a support face.

3. The mobile terminal of claim 1, wherein the main body comprises first and second bodies which are foldably connected by a hinge unit, and the projector may be rotatably mounted at the hinge unit.

4. The mobile terminal of claim 3, wherein the projector is configured to be rotatable to project beams in a first direction defined by facing surfaces of the first and second bodies in an unfolded configuration and a second direction which is the opposite to the first direction.

5. The mobile terminal of claim 4, wherein at least one of the first and second bodies comprises an internal screen to which beams are projected in the first direction.

6. The mobile terminal of claim 5, wherein the internal screen is extended from one of the first and second bodies and has one end which is combined to the other of the first and second bodies.

7. The mobile terminal of claim 3, wherein the hinge unit comprises a stopper that stops a relative movement of the first and second bodies at a certain angle so that the first and second bodies can be supported on the ground at the certain angle.

8. The mobile terminal of claim 1, wherein the operation mode comprises a call reception mode or a message reception mode, and the notification message comprises at least one of a name, a phone number, an image, or content of a message.

9. The mobile terminal of claim 1, wherein the operation mode is an alarm mode informing about a set time, and the notification image comprises time information.

10. The mobile terminal of claim 1, wherein the notification image is displayed in an overlaid manner on the image or is displayed by replacing the image.

11. The mobile terminal of claim 1, wherein the notification image is displayed at one portion of the image display region, and the image is displayed with a reduced size at another portion of the image display region.

12. The mobile terminal of claim 1, wherein the main body comprises a manipulation unit to control an output of the image.

13. The mobile terminal of claim 1, wherein the projector forms a virtual image that can be input by a touch or a motion to the image display region, and the main body further comprises a sensing unit to sense the touch or the motion.

14. The mobile terminal of claim 13, wherein the virtual image comprises a control icon for controlling output of the image, and a keypad icon for inputting at least one of a character, a number, or a symbol.

15. The mobile terminal of claim 1, further comprising:
a focus control unit to automatically control a focus of an image displayed by the projector.

16. A method for controlling a mobile terminal, the method comprising:
projecting beams via a projector to output an image to an image display region separated from a main body; and
executing an operation mode while the image is being displayed, and outputting a notification image via the projector, while outputting the image, indicating that the operation mode has been executed on the image display region.

17. The method of claim 16, wherein the operation mode comprises a call reception mode or a message reception mode, and the notification message comprises at least one of a name, a phone number, an image, or content of a message.

18. The method of claim 16, wherein the operation mode is an alarm mode informing about a set time, and the notification image comprises time information.

* * * * *